United States Patent Office 2,772,854
Patented Dec. 4, 1956

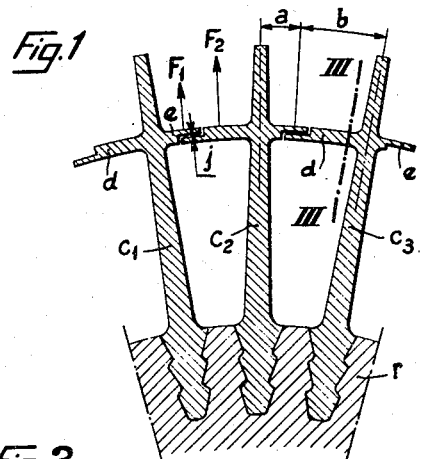
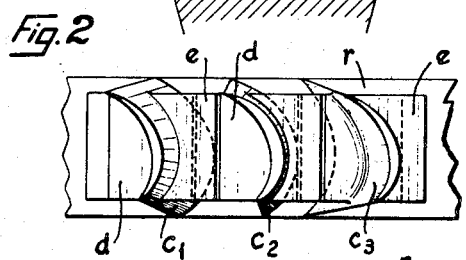
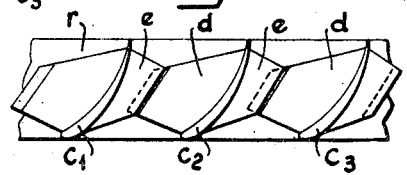
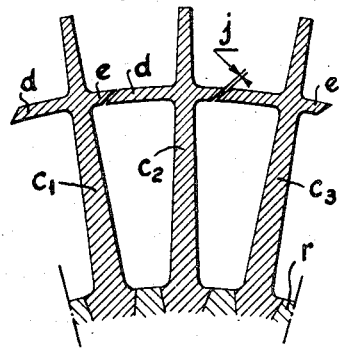
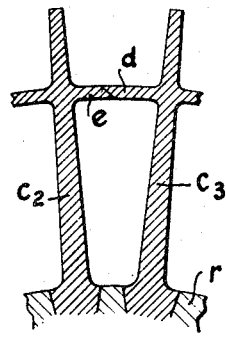

2,772,854

VIBRATION DAMPING MEANS FOR BLADINGS OF TURBO-MACHINES

René Anxionnaz, Paris, France, assignor of one-half to Societe Rateau (Societe Anonyme), Paris, France, a company of France Application February 12, 1952, Serial No. 271,258

Claims priority, application France February 27, 1951

3 Claims. (Cl. 253—77)

As known, vibrations occurring in the movable blades of steam or gas turbines, axial-flow compressors, propeller screws, or other turbo-machines must be damped, and various damping devices have already been proposed.

These devices effect damping of vibrations, through friction between appropriate members and the blades. Their object is not to give rise to vibration nodes, but rather to decrease the vibrating amplitude owing to frictional work of the blade on an extraneous member. However since these devices must necessarily meet strength requirements regarding stress due to centrifugal force exerted during operation, it is not always possible to design them with optimum shapes and masses.

The object of the present invention is to provide vibration damping means which are not subject to the above drawbacks.

According to the invention, the blades are fast with lateral tongues concentric with the rotation axis, a tongue of each blade being in cooperating relationship with the adjacent tongue of the next blade, so that, at a certain rate of operation, said two tongues bear one on the other in frictional engagement, whereby damping friction is produced therebetween.

Other objects and advantages of the invention will be apparent during the course of the following description.

In the accompanying drawing in which like reference characters are employed to designate like parts throughout the same.

Fig. 1 is a fragmentary radial section of the blading of a turbo-machine wheel provided with the damping means of the invention.

Fig. 2 is a plan view of the blading of Fig. 1.

Fig. 2a is a further plan view showing another form of vibration damping tongues.

Fig. 3 is a cross-section taken along line III—III of Fig. 1.

Figs. 4 to 8 show other forms of the invention.

Figure 6:
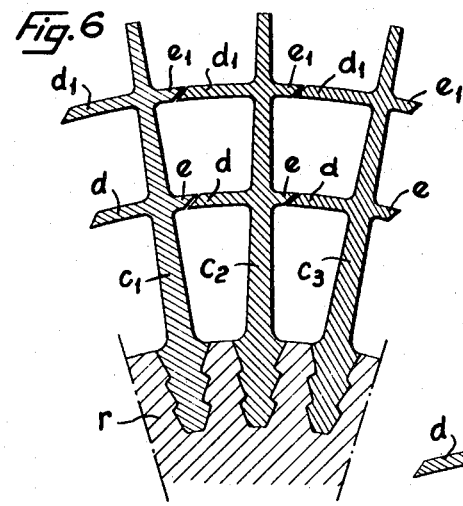

In Fig. 1, $C_1$, $C_2$, $C_3$ indicate three consecutive blades carried by a wheel $r$ through a Christmas-tree joint; but obviously any type of joint can be used, or the blades can even be welded at their foot portion, to the wheel.

At any radial level between the base and the top of the blades, or even at the very top, these blades bear, on both sides thereof, protruding parts or tongues $d$ and $e$ concentric with the axis of the wheel and thick enough to stand centrifugal stresses, each of said tongues overlapping, with a very slight clearance $j$, the adjacent tongue of the next blade.

If the two lateral tongues $d$ and $e$ were given the same length, the sags resulting from centrifugal forces would be equivalent in each of them, and the clearance $j$ would remain practically unaltered.

It is always possible to give the tongues lengths in the ratio of $a:b$ or such shapes that the difference in the sags caused by the unequal centrifugal forces $F_1$ and $F_2$, cancels the clearance as shown as a predetermined R. P. M. is reached and gives rise, beyond said R. P. M., to frictional forces which depend, on the one hand, on the contact surface between the tongues and, on the other hand, on the relative amplitude of vibrations of the blades; these frictional forces cause damping of these vibrations.

The width, shape and mass of the tongues $d$ and $e$ therefore form adjusting factors of these vibration damping forces.

More particularly, the width of the tongues $d$ and $e$ may be equal to that of the blade measured on a level with these tongues, as shown in Fig. 2, or smaller than this width, or else the tongues may be of trapezoidal shape, as shown in Fig. 2a.

Lastly, it may be of interest to give the tongues $d$ and $e$ a cross-section in the form of a biconvex lens (Fig. 3) rounded off at the upstream end and tapering at the downstream end, so that these tongues cause the least possible disturbance as regards the axial flow.

In certain cases, it may be unnecessary to have a large bearing surface between the tongue $d$ and $e$. The embodiment shown in Fig. 4 may be resorted to; in this embodiment, the contact surfaces of the tongues $d$ and $e$ are mere chamfered edges.

If the damping means according to the invention are located at the periphery of the rotor, i. e. at the top of the blades, they may be given the ordinary outlines of blade flanges and carry staggered edges or any other tightness device, the essential feature of the means described being the cancelling, at a certain rate of operation, of the clearance and the waste of energy through friction when the vibrations of two consecutive blades are out of phase or have different amplitudes.

It is also possible, by reversing the arrangement of the bearing surfaces between the tongues, as shown for instance in Fig. 5, that friction resulting from bearing through elasticity, only occurs at low speeds and disappears at high speeds owing to the fact that centrifugal force becomes preponderant on the tongues $d$ and urges them away from the tongues $e$.

Figure 7:
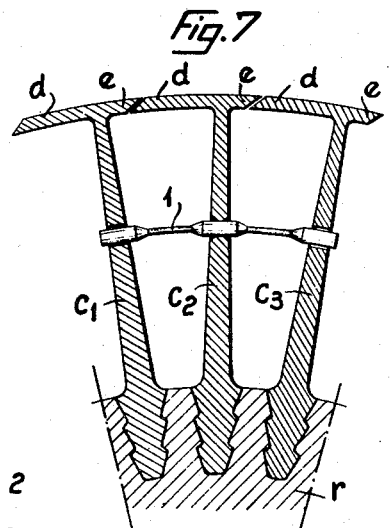

Multiple damping devices can be provided, i. e. devices including two or more concentric rows of tongues. Fig. 6 shows such an embodiment which includes two concentric rows of tongues $d$, $e$ and $d_1$, $e_1$. The damping devices according to the invention can also be combined with different damping devices. Thus Fig. 7 shows an embodiment which comprises, at the top of the blades, a row of tongues $d$ and $e$ according to the invention and, at an intermediate level, a wire 1 of variable cross-section, secured to some of the blades (e. g. $C_2$) and frictionally related to the other ones which it crosses through convenient holes, as described in patent application Ser. No. 246,141, filed on September 11, 1951, and now abandoned.

Figure 8:
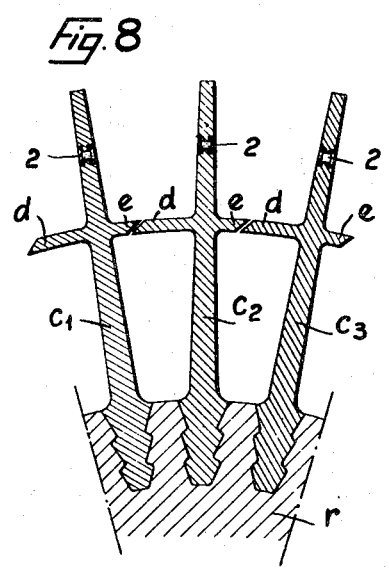

Fig. 8 shows a further embodiment in which the blades (or some of them) comprise small blocks 2 housed in holes through these blades, as described in patent application Ser. No. 232,316 filed on June 19, 1951. These blocks 2 can move between two stops, so that friction (due to centrifugal force) between the blocks and the walls of the corresponding holes damps vibrations, thus enhancing the damping effect due to the tongues $d$ and $e$.

What I claim is:

1. In a turbo-machine rotor having a plurality of rotary blades circumferentialy spaced around the entire periphery of said rotor, means for damping vibrations of said blades comprising laterally protruding members on both sides of each blade, integral therewith at one end and free at the other end whereby said members undergo deflection when subjected to bending stress due to centrifugal force, the respective members of each pair of adjacent members belonging respectively to each two consecutive blades having substantially different mean lengths as measured between said ends and having opposed overlapping and parallel free surfaces adapted to come into frictional contact with each other, the said surfaces lying in planes substantially parallel to the axis of said rotor.

2. The device defined in claim 1, the surface of the shorter of said adjacent members facing radially inwardly toward said rotor and the surface of the longer member facing radially outwardly from said rotor.

3. The device defined in claim 1, said surfaces being spaced from each other to provide a clearance therebetween in the absence of centrifugal force.

References Cited in the file of this patent

UNITED STATES PATENTS

| | | |
|---|---|---|
| 1,542,402 | Meissner | June 16, 1925 |
| 1,544,318 | Hodgkinson | June 30, 1925 |
| 1,554,614 | Allen | Sept. 12, 1925 |
| 1,618,285 | Kasley | Feb. 22, 1927 |
| 1,618,292 | Meissner | Feb. 22, 1927 |
| 1,663,563 | Ray | Mar. 27, 1928 |
| 1,749,449 | Stevenson | Mar. 4, 1930 |
| 2,198,784 | Mikina | Apr. 30, 1940 |

FOREIGN PATENTS

| | | |
|---|---|---|
| 315,722 | Great Britain | Feb. 27, 1930 |